Oct. 6, 1936.  W. B. STOUT  2,056,218
RAILWAY CAR
Filed Sept. 2, 1933  5 Sheets-Sheet 1

Inventor:
William B. Stout
By Gibson, Mann & Co.
Attys.

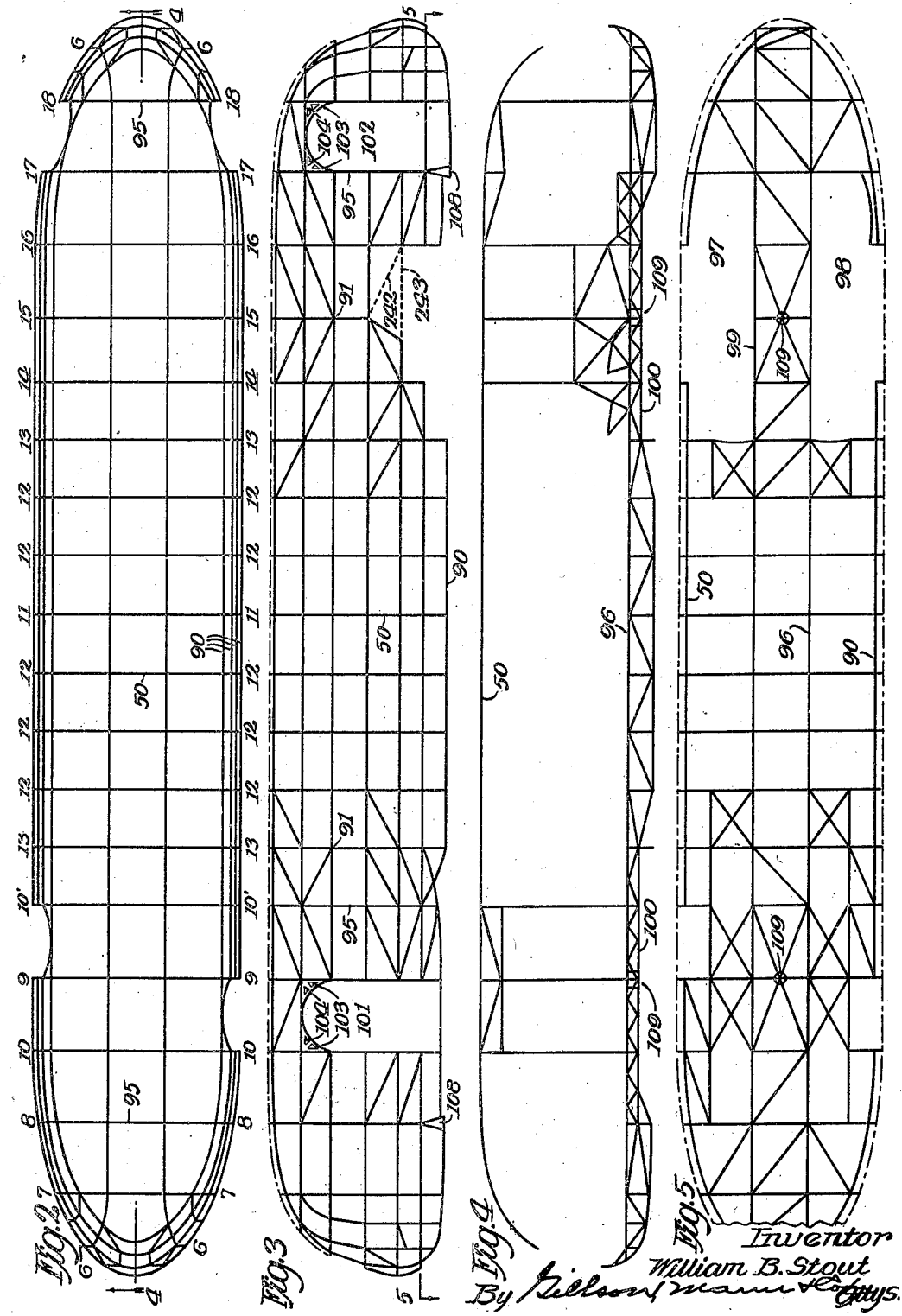

Oct. 6, 1936.                W. B. STOUT                2,056,218
                              RAILWAY CAR
                       Filed Sept. 2, 1933      5 Sheets-Sheet 3
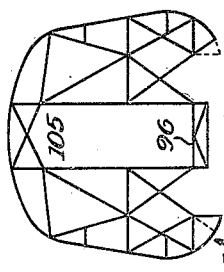
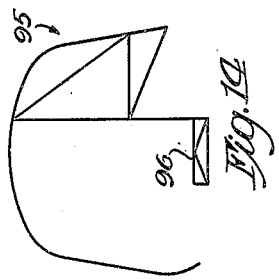
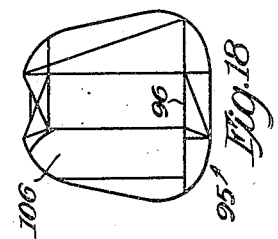
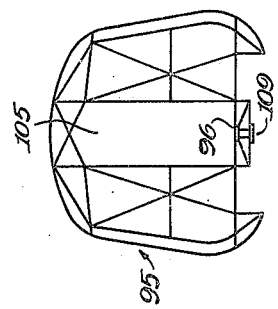
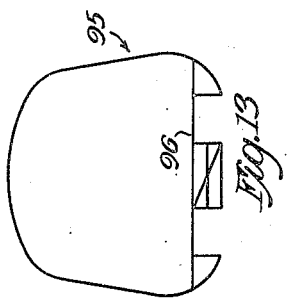
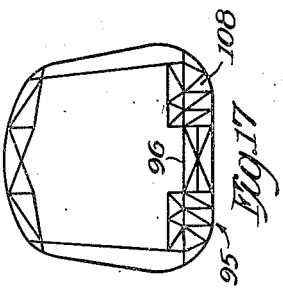
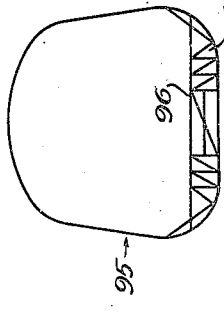
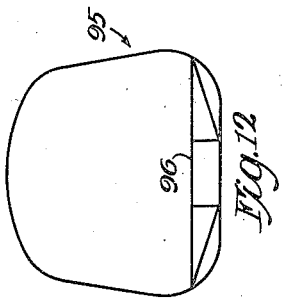
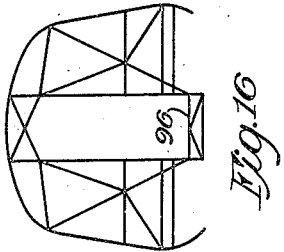
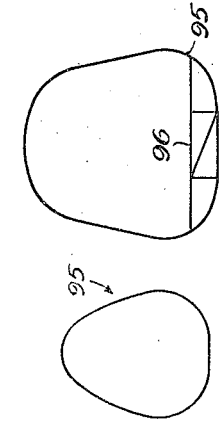
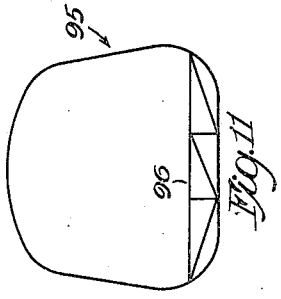
Inventor:
William B. Stout
By Gibson, Mann & Attys.

Oct. 6, 1936.  W. B. STOUT  2,056,218
RAILWAY CAR
Filed Sept. 2, 1933   5 Sheets-Sheet 4
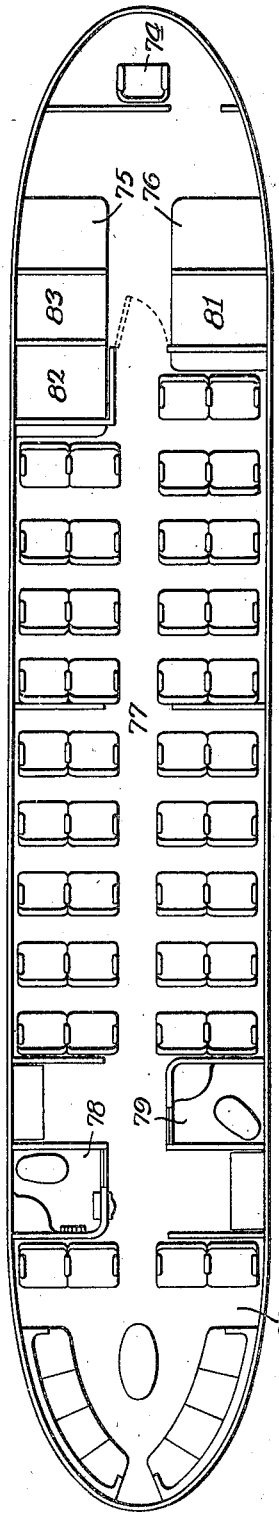
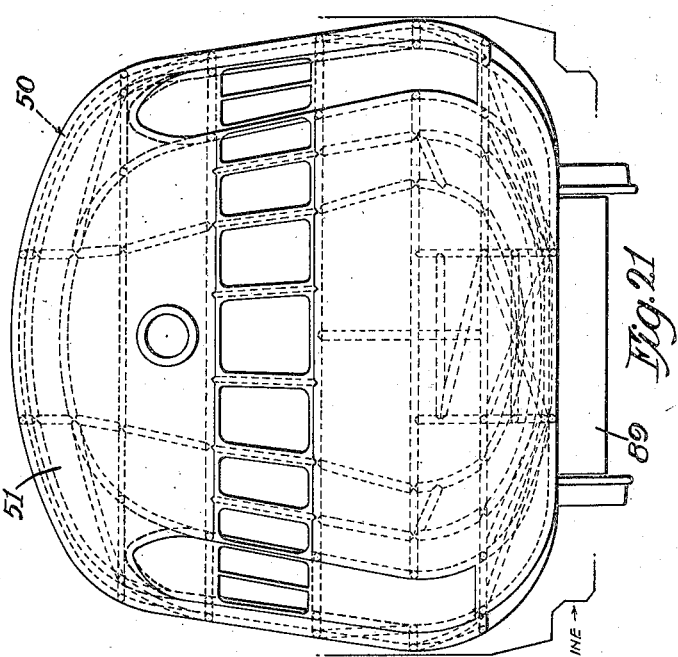
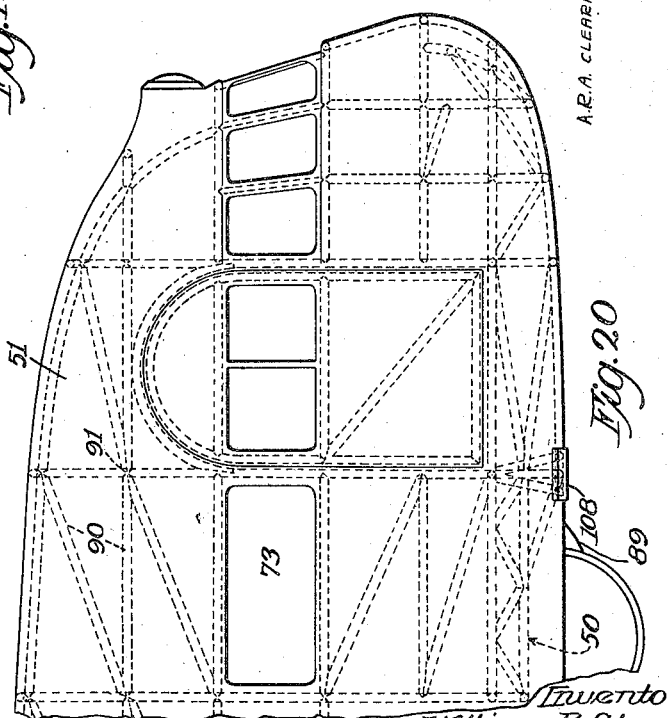

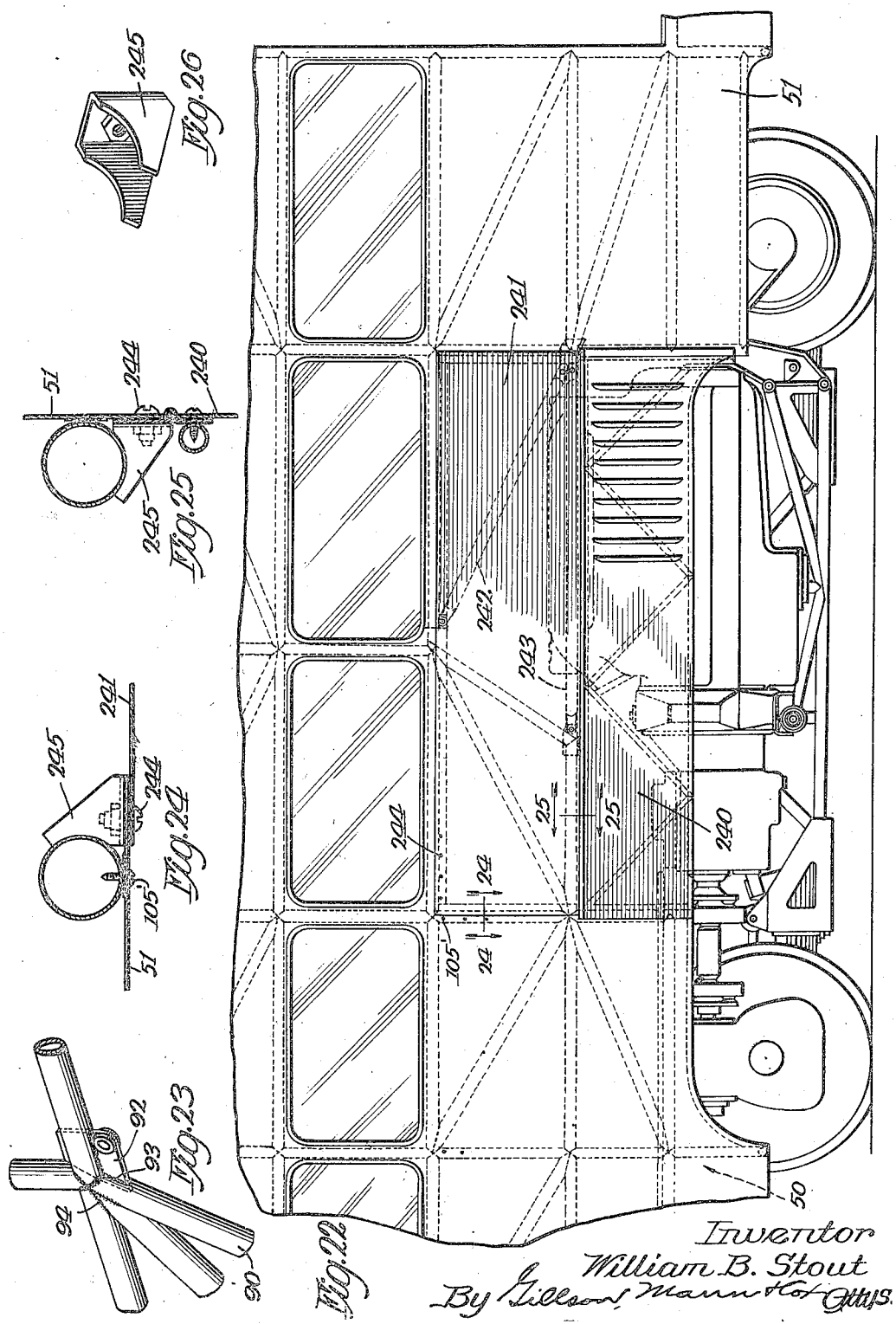

Patented Oct. 6, 1936

2,056,218

UNITED STATES PATENT OFFICE 2,056,218

RAILWAY CAR

William B. Stout, Detroit, Mich., assignor to Pullman-Standard Car Manufacturing Company, a corporation of Delaware Application September 2, 1933, Serial No. 688,001

9 Claims. (Cl. 105—396)

The improvements in air craft made in the last few years by using shapes and lines suited to the performance sought has stimulated the interest of automotive engineers in reforming their designs, and salesmen have again made "stream-lining" a theme of sales talk with customary misuse to the deception of the ever gullible public that still buys many oddities as streamline cars. But the fact is that the drop-shaped streamlined body is not suitable for automotive vehicles in general, and is hardly applicable at all to rail cars.

The swiftest bird is shaped for movement through the air that supports it and, in effect, becomes an enveloping stream flowing over the bird from front to rear. The fastest fish is built to move through a supporting stream of water running from head to tail. These natural shapes are streamlined to suit air in one instance, and water in the other. They teach much about air and submarine craft, but give little help on a rail car or train.

A land vehicle is supported on the solid ground and runs through air which has varying motion relative to the land in one respect and relative to the train in another respect; and the air near the ground has different pressure characteristics from free air well above the ground.

The crab and turtle are shaped to rest or move on the earth and let the water flow over them in any direction with little resistance. But water is noncompressible and its motion relative to the crab or turtle is slow—measured in feet or inches per minute. Air, on the other hand, is compressible, and often moves rapidly relative to the earth on which the vehicle is propelled in another direction at high speed.

Theoretically the contour of a car should minimize the resistance of air without regard to the relative direction of flow; and if railroads could be built anew without regard to cost, many problems could be avoided, but any new rail car or train must run on existing tracks within existing track clearances and provide suitable additional room for passengers and space for freight.

Car resistance is made up of parts due to weight (gravity) that appear as track resistance, journal friction, etc., and also parts due to the size and shape of the car that determine the rearward components of wind, actual or relative, and low pressure areas induced by the movement of the car with respect to the air.

Slow motion moving pictures of a track under a passing train of conventional weight, reveal a movement not unlike that of a primitive suspension bridge when people walk over it. The cause and the remedy for track and roadbed difficulties are easily determined from such pictures. The excessive weight is the destroyer and must be reduced.

The parts of car resistance in the second group are complicated by the fact that the path of the car, although through the air, is in the vicinity of the earth in shapes that vary from a tunnel through a cut to ties and ballast on a fill or a bridge. Each of these shapes has its own peculiar reaction with the passing car and the intervening air, and makes resistance in proportion as the adjacent surface of the car and the earth approach the relation of a turbine run backwards.

The turbine effect is particularly noticeable between the broken, irregular underside of conventional cars and the cross ties and ballast over which it travels.

Wind pressure from the side, either directly, or any position having a transverse component, has a peculiar effect, of which little has been learned, because the great weight of conventional cars has prevented these transverse forces from showing their real over-turning tendencies.

But the reduction in weight of conventional structures would reveal a new problem:—keeping the cars from being blown over.

It is peculiar, but none the less true, that a head-wind at approximately 16° from the direction of travel produces the greatest overturning effect. This is because the pressure on the windward side is aided by the suction or low pressure produced on the opposite side. The conventional car shape fosters this condition both by presenting large flat areas on the windward side and by presenting obstructions of almost every kind to the easy flow of the air from the windward side to the leeward side, which would tend to maintain substantially uniform pressures at opposite sides.

In the broad sense, the object of this invention is to make a car, of a given load capacity, lighter without loss of strength and shock resistance, and faster with less power as compared with prior cars, and also able to hold the track in spite of the greater relative wind velocity at angles to the line of travel which arise from the increased speed, all with appropriate cost; and otherwise suited to existing conditions.

Generally speaking, lightness with ample strength is obtained:

*First.*—By using tubes for all structural members and welding for all joints, whereby the metal is used to the greatest advantage and heavy joint fittings and localized strains are obviated, and the whole body is made one coordinate entity; and

*Second*.—The motors and other weighty elements of the operating mechanism are mounted close to the rails and the parts to be driven or stopped, whereby the body, the center bearing, the side bearings, and all other parts in the line of force transmission, are relieved of much strain and may be made correspondingly lighter.

Being lighter, less power can handle the car as well as its best predecessor but, in addition, the air resistance (which increases rapidly with the speed, other things remaining the same) is tempered by lowering the car and reducing or eliminating suction areas, vortexes or whirls and reverse turbine effects between all parts of the car, the track and other stationary objects, whereby the speed can be increased out of all proportion to the power and speed of the past.

The greater speed increases the transverse component of all wind resistance (and with conventional forms would increase the resultant suction effects) and there would be greater tendency to overturning which the lighter weight would be less able to resist, but for the fact that the wind is passed easily and smoothly under and over the car and the flat upright surfaces are reduced to a minimum, whereby the pressure on the leeward side is kept close to that on the windward side.

In a more specific sense, this invention deals with the fabrication of a car body, particularly suitable for use with a high speed rail car such as has been described. In the same sense, it is the aim of this invention to provide a car body which combines the qualities of light-weight, strength, durability, adequate carrying capacity, graceful appearance, reduced air resistance, and economy of manufacture.

Further and other objects and advantages will become apparent as the disclosure proceeds and the description is read in conjunction with the accompanying drawings, in which Fig. 1 is a diagrammatic, perspective view of a rail car made in accordance with this invention;

Figs. 2 and 3 are diagrammatic plan and side elevational views, respectively, of the body framework;

Figs. 4 and 5 are diagrammatic, vertical and horizontal, longitudinal, sectional views, respectively, of the body framework, the sections being taken on the lines 4—4 and 5—5 of Figs. 2 and 3, respectively.

Figs. 6 through 18, inclusive, are diagrammatic, transverse, cross sectional views of the body framework, the several views being taken on section lines (Fig. 2) corresponding to the respective figure numbers, and like cross sections being indicated by like section numbers; the dotted lines in Fig. 10 indicating the modifications corresponding to section 10'—10';

Fig. 19 is a plan view showing the interior of the car;

Fig. 20 is an enlarged side elevational view of the car nose, the structural framework being shown in dotted lines;

Fig. 21 is a front end view of the car;

Fig. 22 is a fragmentary, side elevational view showing the removable panel which affords ready access to the driving motor;

Fig. 23 is a perspective view of one of the welded tube joints;

Fig. 24 is a sectional view taken on the line 24—24 of Fig. 22, illustrating the application of the metal skin to the body framework.

Fig. 25 is a sectional view taken on the line 25—25 of Fig. 22, illustrating how the lower portion of the removable panel is hinged to permit inspection of the motor;

Fig. 26 is a perspective view of one of the brackets which secures the metal skin to the body framework.

Figure 1:
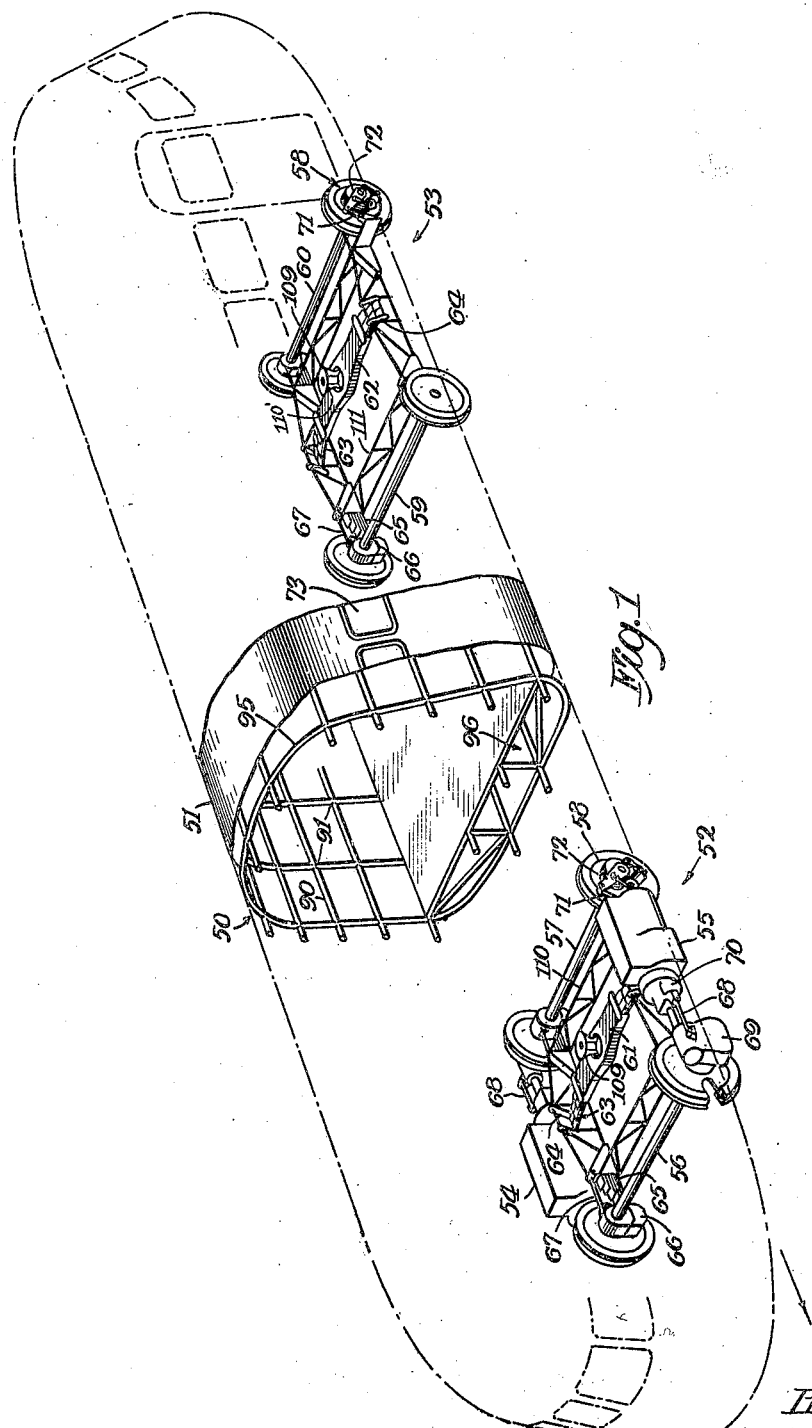

At the outset, it should be understood that the selection of certain preferred and modified forms of the invention for illustration and description is merely for the purpose of disclosure, for the invention may be variously embodied within the scope of the appended claims. Limitations, therefore, are not to be read into the claims unless required by the prior art.

*General organization (Fig. 1)*

The illustrative embodiment of the invention, which is shown in diagrammatic perspective in Fig. 1, clearly shows the application of the several fundamental concepts mentioned above to the general organization of the car.

The car body, it will be observed, comprises a space framework 50 of metal tubing that is welded together to form a rigid unitary body. The framework is covered by a metal skin 51 which is secured to the framework and assists in resisting tortional strain.

The body is supported by a front truck 52 and a rear truck 53, the former having internal combustion engines 54 and 55 mounted outboard on opposite sides of the truck. The front truck includes wheeled axles 56 and 57, diametrical ends of which are driven by the motors 54 and 55. The other diametrical ends of the axles 56 and 57 are equipped with brake operating mechanism, generally indicated at 58.

The rear truck 53 includes wheeled axles 59 and 60, each of which are braked by mechanism corresponding to the mechanism 58 of the front truck.

The driving motors are preferably either gasoline or Diesel engines, and each has a horsepower rating of 160 or more, the exact rating, of course, being dependent on the performance desired.

The axles of both front and rear trucks are equipped with what may be termed "resilient" wheels, and this term is intended to include all forms of wheels which are inherently resilient either by the interposition of rubber under shear, pneumatic tires, springs, or by any other means.

The car body rests upon swing bolsters 61 and 62 of the front and rear trucks, respectively, and, preferably, the bolsters are equipped with cantilever springs 63 which are shackled to swing hangers 64 pivotally suspended from the truck frames.

The truck frames of each truck are fabricated of metal tubing welded together in such manner as to produce space frameworks of necessary strength, and at the four corners of each frame, a leaf spring 65 projects toward the adjacent axle where it connects to a journal box 66. The point of connection between the projecting spring and the journal box, is underslung with respect to the axles.

Driving and braking forces applied to the car axles are transmitted to the truck frames by radius rods 67. Other radius arms 68 which connect the worm gear casing 69 to a fixed point on the car truck,—in this case, the transmission housing 70,—take the thrust of the driving worm. Braking forces are resisted by torque arms 71 which connect the brake housing 72 to the truck frame.

The car body, it will be seen (Fig. 3), is elongated and has a tapering blunt nose and tail to reduce wind resistance. The outer surface of the car consists of smooth broad curves well blended together to produce a graceful appearance, and at the same time directing the air currents around the car with minimum effort. The windows 73 are flush with the outer skin, and are made stationary, as it is contemplated that a forced system of ventilation will be used.

The bottom of the car is uninterrupted in outline except for the wheels of the truck which project through the metal skin enveloping the body framework.

The interior of the car is shown in Fig. 19, and the reference character 74 designates the motorman's seat, 75 and 76 baggage compartments, 77 the main passenger space, 78 and 79 lavatories, and 80 the observation salon.

The engine radiators are mounted horizontally in the spaces 81 and 82, leaving a space 83 on one side of the car which may be advantageously used for electrical equipment, such as batteries, dynamos, etc.

Body shape

It is totally impractical to shape the car body so that it most effectively reduces wind resistance. In the first place, a perfectly streamlined body presents a somewhat grotesque appearance and certainly is not pleasing to the eye. It may be said that a car shaped so as to offer the absolute minimum resistance to air currents would not respond to the art fundamental, a term which is used in art to signify certain relative proportions which have been found to have grace, symmetry and pleasing appearance. It is, therefore, desirable to sacrifice some of the advantages of reduced wind resistance in order to give the car a graceful appearance.

The American Railway Association clearance line (Fig. 21) imposes another limitation upon the shape of the car. The clearance line, as is well known, fixes the outside limits for car body contour, including all equipment that is carried by the car. No part of the car is supposed to project beyond this limiting line, and all American car builders respect the rule.

A third limiting factor which forces a compromise in the shape of the body is the interior space required for passengers and baggage. The car body must be sufficiently wide at its base to give reasonable seating capacity. But at the top it need not be as wide. The sides of the car may, therefore, taper inwardly toward the top, and this enables cross winds to be properly dealt with.

A body shape which satisfies the three principal requirements set forth above is one which is substantially ovate in cross section and is provided with a tapered blunt nose and tail. Wind tunnel tests have demonstrated that such a shape has low wind resistance both as against a front wind and a cross wind. In addition, the car is graceful, affords ample passenger space, and can easily be made within the American Railway Association clearance lines.

By referring now to Figs. 1, 2, 3 and 6–18, inclusive, a more accurate conception of the body shape may be discerned. It will first be observed that all lines of the body are blended together with smooth broad curves and that there are no projections which impede the flow of air over the surface of the car.

The general ovate, cross sectional shape, as shown in Figs. 6–18 has several distinct advantages over conventional cross sections. Air currents striking the side of the car at right angles to the longitudinal axis of the car are carried along the upper and lower curved surfaces with comparatively little resistance and since the side of the car tapers upwardly, there will be but a small area at the side of the car which produces eddy currents. On the lee side of the car, there is a relatively small low pressure area, for in the same manner that the smooth curves and sloping side wall carry the air currents over and beneath the car on the windward side so also do they tend to reduce the low pressure on the lee side.

The shape of the car in plan also contributes to the low wind resistance which it offers to forward movement. Since the nose and tail are blunt and tapered, air currents striking the car from the most unfavorable angle, viz. 16° from the direction of travel, will follow generally the contour of the body and will produce a relatively small low pressure area on the lee side of the car.

It has already been stated that the possibility of overturning the car becomes a very important consideration when the car is made of lightweight materials and travels at a high rate of speed. The relatively small low pressure area on the leeward side combined with a reduced high pressure area on the windward side effectively eliminate the possibility of overturning the car by wind resistance. The overturning effect is further minimized by the fact that the car body rests relatively low upon the supporting trucks so that the force of the wind acting through the center of pressure has a relatively short lever arm as compared with the lever arm in an ordinary car. The blunt tapering nose and tail in their vertical projection have the same effect upon breaking the wind as the sides of the car have in allowing cross winds to slip easily over and beneath the car.

The transverse cross-sections, taken adjacent the ends of the car, are more truly egg-shaped or ovate than the intermediate sections, but for convenience the term ovate will be used to designate the characteristic shape which includes upwardly tapering side walls and smoothly rounded top and bottom walls. As the intermediate sections are fuller and more nearly round than the end sections, the term ovate rotundate may be used to more specifically describe their shape.

Preferably the car trucks are provided with a metal skin 89 in the form of a pan, which carries out the reduced wind resistance effect, but does not interfere with the relative movement between the truck and body. The pan is secured to the bottom of the truck frame by screws, or other suitable means.

Body fabrication

Conventional railway cars weigh from 110,000 to 150,000 lbs. or more. This great weight is brought about by the use of a heavy underframe, in some cases a one piece casting, and by the use of relatively heavy side, end, and roof frameworks. The trucks also add greatly to the weight of the car and usually heavy metal plates are either welded or riveted to the side and end frames to further increase the weight of the car.

Since one of the prime objects of the present invention is to reduce car weight and thus to obtain greater operating efficiency from given power, an entirely different principle of car construction is used.

In proportion to its weight, a tube is the strongest columnar structural element known. This relationship is commonly expressed by saying that it has a relatively high form factor. It is, therefore, used as the basic unit of the rail car of this invention. It will be understood that the word "tube" is not limited to round tubing, but includes tubing that is square, or any other polygonal tubing.

Not only is the tube used as a basic structural element in the car, but the car as a whole is in the form of a tube and thus has great strength in proportion to its weight.

All joints in the body are preferably welded together, so that fittings are totally eliminated. If fittings were used, the weight of the car body would be materially increased.

The body framework, generally designated 50, consists of a plurality of steel tubes 90, having their intersecting ends rigidly welded together as indicated at 91. Wherever there is need for a particularly strong joint, the tubes are slit, as indicated in Fig. 23 to receive a reinforcing plate or gusset 92 which is then welded to the tubes as indicated at 93 and the tubes themselves welded together, as indicated at 94.

The body framework 50 as a whole constitutes a space framework consisting of a plurality of ovate shaped sections 95 held in spaced relation by the connecting tubes 90 with the lower portion of the framework built up to form a floor truss 96 which extends the full length of the car.

Since the car body is to rest well down upon the car trucks, it is necessary to construct the floor truss so that there are cut-away portions 97 and 98 which are adapted to accommodate the driving motors on the front truck. The cross bracing shown in Figs. 4 and 5 well compensates for the smaller width of the floor truss adjacent the front of the car. In addition the tubing used for this narrow portion 99 of the floor truss is of heavier gauge than that used in the remainder of the car so that adequate strength is provided at this point.

The depth of the trussed understructure is also reduced at the narrowed section 99 and the same is true at the rear of the car where the rear truck supports the car body. This lessening of the depth of the understructure is indicated at 100.

Adjacent to the front and back of the car, additional truss work is used, as clearly shown in the drawings, to take the shock of minor impacts.

Since the truss work from front to rear and vice versa is interrupted by the door spaces 101 and 102 (Fig. 3) metal plates 103 having cut-out portions 104 are welded to the top of the door frames to form lintels for the doors and to give the necessary rigidity to the body framework at these points.

The truss work is carried from one side of the car to the other, not only through the understructure, but through bulkheads, such as are shown in Figs. 9, 10, 15, 16, 17 and 18. In Figs. 9 and 10, the bulkheads leave a passageway 105 and between the bulkheads, the lavatories are placed, as shown in Fig. 19. In Figs. 14–17, inclusive, bulkheads are shown which divide the interior space into baggage compartments (see Fig. 19). The bulkhead shown in Fig. 18 separates the cab from the rest of the passenger space and provides a doorway 106 for communication between the cab and passenger space.

The tubing as used in the body framework need not necessarily be of steel, but may be of aluminum, or some alloy which is particularly suited for the purpose.

The exterior of the framework 50 is substantially covered by a metal skin 51 which preferably completely encircles the car body except for the necessary openings to accommodate the car trucks. The skin may be made of aluminum, steel, or Dural, the latter being an alloy of aluminum which combines strength with light weight.

The skin is rigidly secured to the body framework by self-tapping screws 105' (Figs. 22 and 24). Preferably fabric strips are interposed between the tubes and the skin and between the layers of skin where two sections overlap in order to make the outer shell waterproof and noiseless.

Where the framework and metal are both made of steel, the two are preferably joined by welding or riveting, as is common in car building practice.

Provision is made in the understructure for permitting the car body to be raised by jacks from the car trucks in case the car is derailed, or for the purpose of repair. These jacking pads 108 are built into the understructure, as shown most clearly in Figs. 3, 8 and 17. The additional truss work which forms a part of the jacking pads protects the rest of the body framework from damage by the application of a load at points spaced from the front and rear center bearing.

The center bearing structure, which is shown in a general way in Fig. 1, differs from that generally used in railway cars. Ordinarily the car body carries a body bolster which has an aperture through which a center pin passes. In the present construction, a collar 109 is welded into the understructure (Figs. 4, 5, 9 and 15) at the two points where the front and rear trucks are swiveled to the car body. The collar is provided with four laterally extending wings 110' (Fig. 1) which serve as gussets in reinforcing the collar.

The total weight of a car built in accordance with this invention, and having a load carrying capacity comparable to a conventional car, is from 35,000 to 40,000 pounds, using chrome molybdenum steel tubing for the space framework and oxy-acetylene welded joints. The weight may further be decreased by using aluminum alloys in place of chrome molybdenum, but at greater expense.

The skin 51 is an important structural element of the car body. It gives the car much of its rigidity and serves effectively to resist tortional stresses. When made of aluminum alloys, such as Dural, it preferably has a thickness of from .03 to .06 of an inch.

The load reaction from the trucks, in addition to being taken up by the heavily trussed framework in the vicinity of the center bearings, is transmitted in part through the adjacent bulkheads to the side of the roof structure, including the metal skin, so that the entire car assists in resisting bending stresses.

It will be observed, too, that the fore part of the car is designed to take the shocks of collision, for while it would crumple if the shock were sufficiently great, yet the energy absorbed by the local crumpling would protect the remainder of the car from serious damage and reduce the possibility of fatal injury to the passengers.

One of the outstanding contributions of this invention to the car building art is the teaching that the outside sheathing, particularly when in the approximate form of a rotundate tube, may be relied upon to carry substantial portions of the car load with a consequent saving in the size and strength of material to be used in the car framework. The side sheathing is most important in minimizing car deflection, and it will be understood that in some cases, the bottom sheathing may be eliminated.

Removable panels opposite motors

In order to permit ready inspection of the motors, a hinged panel 240 is provided which affords easy access to the motor. The hinged joint is shown in Fig. 25; and a side elevation of the panel in Fig. 22.

In case it is necessary to remove a motor for repair, a panel 241 may be removed exposing the body framework. As the tubular members 242 and 243 would interfere with the removal of the motor, they are made detachable by providing joints such as shown in Fig. 22.

The removable panel 241 is secured in place by screws 244 which engage brackets 245 welded to the adjacent tubular members. The hinged panel 240 is directly below the removable panel and is supported in part by the former. Obviously both panels could be removed as a unit if desired.

I claim:

1. A relatively light, high speed railway car comprising a pair of trucks, a car body pivotally mounted on the trucks, said body comprising a space framework of metal tubing welded together into a rigid structure, a metal skin substantially covering the framework and rigidly secured thereto and extending continuously around portions of said body, driving motors mounted outboard on opposite sides of one of the trucks, and means for quickly removing a portion of the body framework and the enveloping skin for access to the motors, said framework being trussed along the margin of said portion of the framework.

2. For use on a relatively light, high speed railway car comprising a pair of trucks having driving motors mounted outboard on opposite sides of one of the trucks, a car body adapted to be pivotally mounted on the trucks, said body comprising a space framework of metal tubing welded together into a rigid structure, a metal skin substantially covering the framework and rigidly secured thereto and extending continuously around portions of said body, and a hinged panel extending downward, outwardly of said motors and substantially in longitudinal alinement with said skin for obtaining ready access to the motors, said body being trussed along the margin of said panel.

3. In a high speed railway car, a car body characterized by its light weight and its resistance to torsional and bending stresses and comprising framework of relatively light material, said framework including a plurality of transverse sections having smoothly rounded tops and bottoms and connected by longitudinal framing members, a car floor, means to transmit floor loads to the framework, and a relatively thin metal skin rigidly secured to the exterior of the framework and forming approximately a rotundate tube extending substantially the length of the car body, said skin serving to provide the outer covering for the car and act as a structural member in resisting stresses acting on the body.

4. In a railway car, a body comprising a framework of welded metal tubing said framework comprising side and roof structures and including an under structure which has cut away side portions adjacent to one end of the body, forming a narrow section, the under structure at said narrow section being made of heavier gauge tubing and being additionally trussed to withstand a greater strain, and a center bearing collar welded into the framework at said narrow portion, means to transmit loads from said collar to said framework, a car floor, and means to transmit floor loads to said framework.

5. In a railway car, a car body comprising framework of relatively light structural members having intersecting ends fastened together and forming a rigid unitary body, the central portion of the car comprising a plurality of transverse sections each of which consists of a substantially continuous member in the form of a rotundate loop defining the general cross sectional shape of the body, and a floor truss on the bottom of the loop forming a part of said framework.

6. In a railway car, a car body comprising framework of relatively light structural members having intersecting ends fastened together and forming a rigid unitary body, the central portion of the car comprising a plurality of transverse sections, each of which consists of a substantially continuous member in the form of a rotundate loop defining the general cross sectional shape of the body, a floor truss on the bottom of the loop, and a metal skin rigidly secured to the framework and extending substantially all around the framework to form a tube which acts as a structural member to resist substantial portions of the stresses acting on the car body.

7. In a railway car, a body comprising a framework of welded metal tubing, said framework comprising side and roof structures and including an under structure which has cut away side portions adjacent to one end of the body, forming a narrow section, the under structure at said narrow section being made of heavier gauge tubing and being additionally trussed to withstand a greater strain, a car floor, and means to transmit floor loads to said framework.

8. In a railway car, a car body comprising framework of relatively light structural members having intersecting ends fastened together and forming a rigid unitary body, the central portion of the car comprising a plurality of transverse sections each of which consists of a substantially continuous member in the form of a rotundate loop defining the general cross sectional shape of the body, a floor truss on the bottom of the loop forming a part of said framework, and jacking pads adjacent to the ends of the car, said jacking pads consisting of trusswork extending transversely of the body and constituting a part of the floor truss.

9. In a high speed railway car, a car body characterized by its light weight and its resistance to stresses and comprising framework of relatively light material, said framework including a plurality of transverse sections having smoothly rounded tops and connected by relatively light longitudinal framing members, a car floor, means to transmit floor loads to the framework, and a relatively thin metal skin rigidly secured to the exterior of the sides and top of the framework and serving to provide the outer covering for the car and act as a structural member in resisting stresses acting on the body, said skin and framework being largely responsible for carrying the car loads and limiting car deflection.

WILLIAM B. STOUT.